(12) United States Patent
Souissi et al.

(10) Patent No.: US 6,920,171 B2
(45) Date of Patent: Jul. 19, 2005

(54) MULTIPLE ACCESS FREQUENCY HOPPING NETWORK WITH INTERFERENCE ANTICIPATION

(75) Inventors: Slim Souissi, San Diego, CA (US); Leo G. Dehner, Southlake, TX (US); Eric F. Meihofer, Euless, TX (US)

(73) Assignee: Motorola, Inc., Schaumburg, IL (US)

( * ) Notice: Subject to any disclaimer, the term of this patent is extended or adjusted under 35 U.S.C. 154(b) by 764 days.

(21) Appl. No.: 09/736,755

(22) Filed: Dec. 14, 2000

(65) Prior Publication Data

US 2002/0075941 A1 Jun. 20, 2002

(51) Int. Cl.[7] .............................. H04B 1/69; H04A 7/00
(52) U.S. Cl. ........................ 375/133; 375/132; 370/330
(58) Field of Search ................................. 375/133, 132; 370/330, 487, 18

(56) References Cited

U.S. PATENT DOCUMENTS

| 5,546,397 | A | * | 8/1996 | Mahany | 370/310 |
|---|---|---|---|---|---|
| 5,570,352 | A | * | 10/1996 | Poyhonen | 370/330 |
| 5,574,979 | A | * | 11/1996 | West | 455/63.1 |
| 6,157,669 | A | * | 12/2000 | Kotzin | 375/132 |
| 6,256,334 | B1 | * | 7/2001 | Adachi | 375/132 |
| 6,597,671 | B1 | * | 7/2003 | Ahmadi et al. | 370/329 |
| 6,603,799 | B1 | * | 8/2003 | Hlasny | 375/132 |
| 6,608,821 | B1 | * | 8/2003 | Gendel | 370/280 |
| 6,643,522 | B1 | * | 11/2003 | Young | 455/552.1 |
| 2001/0002912 | A1 | * | 6/2001 | Tony et al. | 370/487 |
| 2003/0007547 | A1 | * | 1/2003 | Huo | 375/132 |

* cited by examiner

*Primary Examiner*—Amanda T. Le
*Assistant Examiner*—Cicely Ware
(74) *Attorney, Agent, or Firm*—Hisashi D. Watanabe

(57) ABSTRACT

Spread spectrum packet-switching radio devices (22) are operated in two or more ad-hoc networks or pico-networks (19, 20, 21) that share frequency-hopping channel and time slots that may collide. The frequency hopping sequences (54) of two or more masters (25) are exchanged using identity codes, permitting the devices to anticipate collision time slots (52). Priorities are assigned to the simultaneously operating piconets (19, 20, 21) during collision slots (52), e.g., as a function of their message queue size or latency, or other factors. Lower priority devices may abstain from transmitting during predicted collision slots (52), and/or a higher priority device may employ enhanced transmission resources during those slots, such as higher error correction levels, or various combinations of abstinence and error correction may be applied. Collisions are avoided or the higher priority piconet (19, 20, 21) is made likely to prevail in a collision.

18 Claims, 4 Drawing Sheets

MULTIPLE ACCESS FREQUENCY HOPPING NETWORK WITH INTERFERENCE ANTICIPATION

FIELD OF THE INVENTION

The invention relates to methods and apparatus for ameliorating competition among apparatus sharing a spectrum, such as in a frequency hopping communications network. The invention while broadly applicable may be particularly advantageous for short range wireless communications such as personal area networks and ad-hoc networks, or similar situations wherein a plurality of packet switching devices communicate through access points that are located or can become located within sufficient proximity to sometimes collide, that is, to hop to the same frequency at the same time

BACKGROUND OF THE INVENTION

Certain frequency bands such as the so-called ISM band near 2.4 GHz (for "Industrial, Scientific and Medical") have been allocated and provided with established protocols that govern transmissions in a manner intended to permit the bandwidth to be shared by a number of simultaneous users. In particular, spread spectrum transmission of digital packet data is used, wherein transmitting and receiving apparatus hop from one frequency to another in a coordinated sequence that spreads the transmissions uniformly over the bandwidth. These frequencies are available for various wireless uses, including local area networks that can employ the same sort of client/server protocols and peer to peer transmissions that are also used for hard wired local area networks comprising a network server.

In a technology known as Bluetooth, a consortium of communications and data processing companies have proposed a standard for use of these frequencies to establish ad-hoc short range wireless networks in which mobile devices can couple together for data communications and also can couple as transients into fixed networks that support wireless access. This standard can make communication and digital data network services accessible to mobile devices in everyday use. Personal electronic devices, such as cellular telephones, pagers, personal digital assistants, laptop and "palm-top" computers, etc., can exchange data and participate in powerful and/or wide ranging networks, without the need for network cards, cables, connectors and interface software that typically are needed to couple a desktop computer to a local area network.

Ad-hoc and client/server networks can be made accessible under various standards and protocols, including but not limited to the Bluetooth standards, the somewhat more generalized IEEE standard 802.11, and other such communication protocols. Input, output, storage, communication and processing devices of a type normally coupled exclusively to network servers or directly to client terminals, such as printers, scanners and other such devices, can be made available generally to wireless devices, without the need to wire a client computer or other terminal apparatus to an associated network (or perhaps directly to the peripheral device). Personal electronic devices are thereby made capable of many new and expanded functions using this technology.

Two or more associations of devices (networks or piconets) occupy overlapping areas or otherwise share a resource by which the two or more such associations can interfere, by producing message packets that collide with one another. In the usual situation, two networks or piconets hop to the same frequency at the same time, although cross talk and other effects may produce collisions in other situations as well.

When plural devices communicate over a data communication network, the devices compete with one another for access to the network resources, particularly transmission time and bandwidth. Frequency hopping data communication schemes permit devices to transmit data on substantially random sequences of frequencies, thus spreading communications over the bandwidth. However the sender and the receiver must operate at the same frequency at the same time. "Random" access also generally means that various devices each can transmit data whenever they have data ready to transmit. As a result, two or more devices may transmit messages at the same time. Overlapping messages that interfere with one another are said to "collide."

When two messages collide, it is possible that neither one will be received without errors. In that case both messages must be transmitted again at a later time. Sometimes one is received correctly and not the other. In networks subject to collisions (sometimes called contention networks), it may be possible for a prospective transmitting device to signal a targeted receiving device to expect a message having certain attributes (e.g., a stated length) and/or to warn other devices off, before attempting to transmit the message. It may also be necessary for a receiving device to signal some form of acknowledgment message back to the sender (ACK) after receipt of a message, such as a measure of the received message length, or parity check information, etc., which might be checked for accuracy. These procedures may be needed because of the possibility that a message transmitted on the contention network may not have been received due to a collision, and represent undesirable overhead.

Message or packet collisions can occur whenever a message transmission by one device affects reception of another message. A collision may occur when two devices having random access to transmit over a network medium happen to transmit messages on the same medium (e.g., the same carrier frequency or channel) at the same time. The messages effectively collide completely, even if the messages only overlapped slightly. For example, the trailing edge of a first message might overlap the leading edge of a second message and garble only the endmost bytes of the message. The sender and receiver cannot distinguish the error free part of the message from the rest.

Collisions also may occur due to less direct conflicts. For example, a transmission on an adjacent channel may interfere, or a reflected image or ghost of a transmitted message may interfere. A collision typically affects the reception of both overlapping messages, but it is possible that one message may overpower the other and one of the two colliding messages may be correctly received. The component bytes of the two colliding messages may be mixed or garbled such that one message cannot be distinguished from another by the receiver(s). If received at all, a data error may be detected by the receiver. The error may have occurred at an unknown position in the message, rendering the error uncorrectable. Both colliding messages are transmitted again.

It is generally considered efficient to permit devices on a network to have relatively free random access to transmit. Some level of contention is generally tolerated in the interest of efficiency, and where necessary, messages subject to collision are resent. Message contention reduces the message throughput of a network. The effect of contention on throughput may be trivial when traffic is light and collisions are unlikely. Load on the throughput due to contention can become severe if traffic is heavy. In a heavy traffic situation, re-transmissions necessitated by frequent collisions increase the traffic and make additional collisions likely, requiring more re-transmissions. With very heavy traffic, the network bandwidth could theoretically all be consumed by unsuccessful colliding messages and colliding re-transmissions that result.

What is needed is a method and apparatus that facilitates efficient communications among the devices that participate in such a network. Advantageously, the communications should be only loosely regulated for maximum versatility, while adhering to rules under which bandwidth is shared. The rules and protocols should either minimize the incidence of message collisions or minimize their adverse effects. Preventing collisions can be expected to decrease the extent of regulation needed which tends to slow down communications, or avoid a centralized controller for allocating time slots thus minimizing collisions.

BRIEF DESCRIPTION OF THE DRAWINGS

The appended drawings illustrate certain exemplary embodiments of the invention as preferred. The same reference numbers are used throughout the drawings to identify the same or comparable elements. In the drawings.

DETAILED DESCRIPTION OF THE PREFERRED EMBODIMENTS

Figure 1:
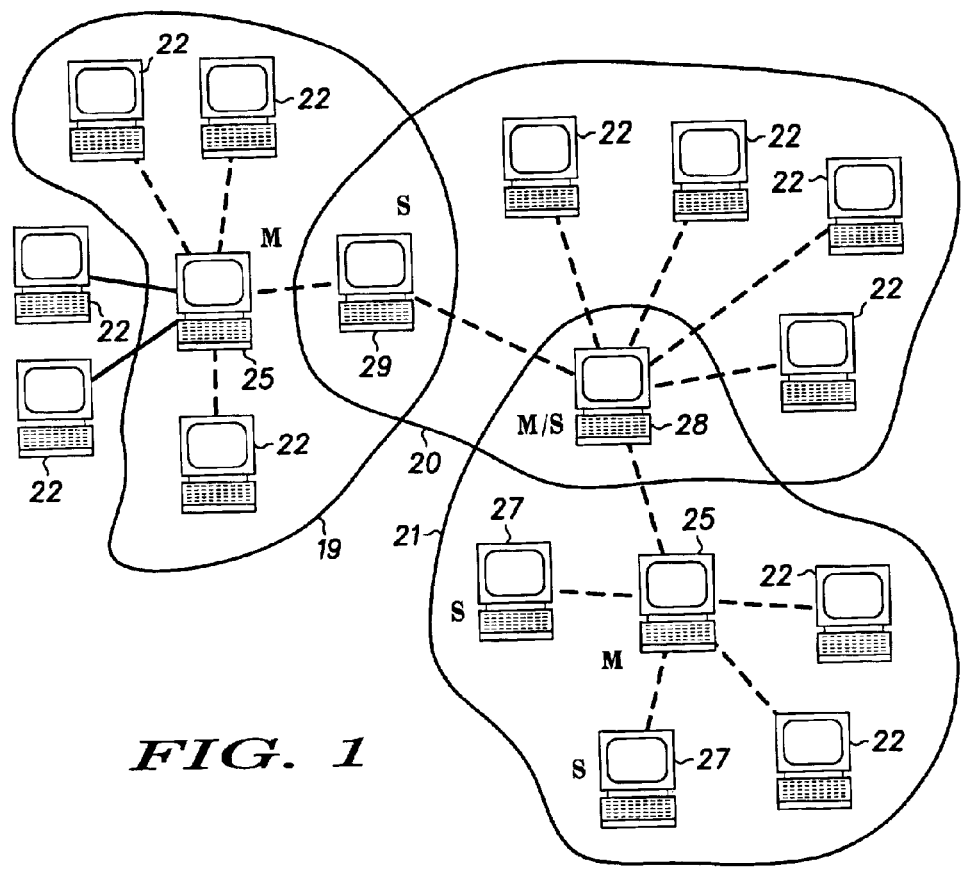
FIG. 1 is a block diagram illustrating a possible configuration of an ad-hoc network according to the invention at a particular point in time, wherein a number of master devices are arranged to communicate with and through slave devices in a plurality of at least partly wireless piconets.

The present invention is arranged to minimize collisions without adding substantially to the regulation of communicating devices, and thus to facilitate the formation and operation of personal area networks and ad-hoc networks. Any of the communicating devices can become an access point or node through which other devices communicate. One or more of the communicating devices can be coupled to a fixed or hard wired network, to function as an access point providing data services to mobile units that happen to come into wireless range. The present invention can optimize or dramatically improve spread spectrum frequency hopped communications by facilitating independent operation of two or more master devices, which may be network access points, in ad-hoc networks or "piconets." According to the invention, provided that two or more potentially colliding ad-hoc networks or piconets are sufficiently aware of one other to project hopping patterns into the future and anticipate collisions, accommodations are made to avoid or ameliorate the collisions. The accommodations can involve priority allocations by which one or more of the potentially colliding networks is caused to abstain during anticipated collisions. According to another embodiment, the accommodations require communicating networks to alter their communications so that at least one network to which priority is allocated, is made more likely to survive an anticipated collision, such as shifting one (or any number) of communicating units into an increased error correction mode temporarily, during the anticipated collision.

The invention is applicable to current wireless systems and standards such as the Bluetooth consortium standard, the Home RF standard, the Metricom Ricochet system, IEEE 802.11, etc. These are exemplary systems that support point to point and multipoint access, but the invention is not limited thereto and generally applies to any spread spectrum frequency hopping system. In an exemplary embodiment, an equipped device functions as a master or access point that synchronizes slave devices in an ad-hoc or "pico-network." This piconet couples devices within a limited range (e.g., 10 m to 100 m) and may also couple with other piconets and/or with access points that have means for data communications with fixed networks or other resources. Master and slave devices thereby couple into data communication with one another and/or with other mobile or fixed devices in a transient manner. In a configuration adapted for commercial use, for example, a user carried mobile device couples transiently into a network located on the premises of a particular business or facility, which has one or more access points capable of packet switched data communications using frequency hopping over a short range. The business or facility network might have a single access point device or plural access point devices, or may have a single unit capable of operating simultaneously on two or more piconets (i.e., conducting simultaneous communications using two or more frequency hopping sequences). Devices operating on a given piconet are synchronized and follow the same hopping sequence, namely a sequence dictated by the master or access point. Devices and piconets that are not synchronized together can also communicate across data paths synchronized to different masters in a "scatter-network." Such networks can arise whenever devices come into range and permit user devices to find and use services temporarily found to be accessible within a short communication range.

The data transmitted on a wireless network may be of any type, in the same manner as data transmitted on wired networks. A wireless network that uses the ISM band, for example with a plurality of discrete channels having a given bandwidth, operates in a spread spectrum mode, and modulation can occur simultaneously on different channels. The overall communications load is spread over a wide frequency band by causing communicating devices to transmit on a given channel in the band and then hop to a different channel to resume communications (i.e., to transmit the next packet).

According to the Bluetooth protocol, frequency jumps occur at 1,600 per second. There are 79 channels, each 1 MHz in bandwidth. Thus 1,600×79, or about 130,000 choices of a time-slot-and-frequency combination become available every second. This 130,000 packets per second is the maximum possible throughput available over the bandwidth by virtue of the channel bandwidth and jumping rate.

The 130,000 opportunities are shared by all piconets that might interact, for example because they are close enough in space that their transmissions overlap. In each individual piconet, the master and slaves (which are the mobile and stationary user devices) share 1,600 packets per second because the jumping sequence of channels is dictated by the master. Assuming that addressing methods successfully allot each successive packet in the jumping sequence to one user device, the maximum possible throughput of a piconet would be achieved, at 1,600 packets per second.

Many of the communications that might be needed by user devices, employ the available communications capacity in bursts. When downloading a file, for example, a user device makes extensive use of the communications capacity until the file download is complete. To keep up reasonable throughput from the perspective of users (i.e., so that no user has to wait a very long time), the number of active user devices permitted on a piconet is limited, for example to seven. The "inactive" user devices are placed in a "sleep" mode temporarily. In the event that a user device needs to commence a communication, it can apply to be placed back into the active device queue.

In situations where it is appropriate to provide active communications for many user devices at the same time (e.g., more than seven in Bluetooth), it is possible to provide a plurality of piconets that at least partly encompass the same physical area and have independent frequency hopping sequences controlled by different masters. The 79 channels and 1,600 time slots per second provide many combinations of time slots and frequencies, but any two independently operating piconets that affect one another (for example because they are adjacent in space), will occasionally experience a message collision because the two independent piconets will sometimes choose the same frequency channel during at least part of the same time slot.

The sending and receiving devices step through the same identical sequence of frequency hops in order to remain in communication. According to the Bluetooth protocol, the specific frequency hopping sequence of any of the communicating devices can be derived by an algorithm from a 48 bit identity code that is unique to each device, the sequence being randomized by the time of day. The codes permitting the hopping sequence to be resolved is contained in communications and thus is available to all the devices that operate on the piconet. A newly arrived device scans through the available channels until it finds a packet transmission. The transmission contains the identity code of the master device of the piconet. The newly arrived device can derive the hopping sequence from this code and begin to track through the sequence together with the other devices on the piconet. The piconet devices include one master and up to seven active slaves (plus inactive or "parked" slaves) that adhere to the master's frequency hopping sequence when coupled to the piconet.

A client/server arrangement is possible using a piconet as described. In one configuration of a piconet, a master or a slave that is in wireless frequency hopping communication with other devices over a piconet, can be a processor or other device that is also coupled into a hard wired network, for example having several processors and a network server coupled by cables through Ethernet network interface cards. The hard wired network can be coupled to one or more devices functioning as one or more wireless access points. A short range application of such a wireless arrangement is a personal area network. Users of terminal devices of various types, such as laptops, cellular telephones, personal digital assistants, etc., may have use for a high bandwidth network connection for specific or general purposes. The devices may also advantageously use services such as large database servers and other services, wide area network connections or Internet connections for messaging, email, browsing and other services, and other uses that may not be practical to support on a mobile device such as a pager, which should be simple and inexpensive. It is inconvenient to accommodate hard-wired connections to a network for such mobile devices. It is much more convenient to provide such devices with wireless data access based on a cellular layout. Thus whenever an equipped wireless device comes within transmission range of another equipped wireless device, communications can be established as if the devices were coupled to the same local area network or the like.

Airports, hotels, convention centers and other facilities frequented by users of the wireless devices can have one or more network access points or "APs," which are functionally similar to the base station of a cellular telephone system, except that the APs provide packet switching data access to one or more services. For example, such a facility can advantageously maintain a network that provides mobile devices with access to a database of topical information on the respective facility. An airport can provide flight schedules. A hotel might provide a list of local restaurants or events of interest to visitors, etc. The facility operators also could offer and close commercial transaction with users. The network accessible through the APs can have various associated application programs available. Examples include an email server or database, general Internet access through a firewall, and generally can provide data services to the user. By using frequency hopping on demand communications between the user devices and the network access point (AP), a high bandwidth data connection is made available to support such services.

Message packets contain some information in addition to their data content. A header or trailer in each transmitted packet identifies the transmitting unit and the destination unit. In a frequency hopping arrangement, the transmitting device and the receiving device must coordinate with one another such that the receiving device hops to the same frequencies at the same times as the sending device, in sequence.

The hopping sequence or next frequency of a given pair of communicating devices can be anticipated by other devices or by a supervisory device. The supervisory device might be a master or an access point or an outside controller, with means to discern the hopping sequence of the pair. There are various issues as to how an anticipated conflict might most efficiently be handled. For example, if two access points anticipate a slot collision, either of the masters could have the option to (1) abstain, or (2) use additional error correction or (3) transmit notwithstanding the prospective collision. If transmitting notwithstanding the collision, the access points could transmit as usual, or could transmit with operational changes. For example, a different data rate or a different transmission power might be used during the collision slot. According to an inventive aspect, such a change can be made as a function of priority. In that case, higher priority messages are transmitted during slots identified as anticipated collision slots, at a higher transmission power or a lower data rate than lower priority messages. In this or in similar ways, the higher priority messages obtain preferential access. Likewise, lower priority messages can be transmitted with some sort of relative handicap compared to higher priority ones, in either case improving the likelihood that the higher priority message will be received correctly, at the possible expense of the lower priority message.

What is needed is an improved procedure for handling actual and anticipated message collisions, in a manner that can accommodate a reasonable number of devices sharing the network and which achieves a maximum successful message throughput.

According to the present invention, such an improved procedure is provided and applied to a network environment such as a personal area network having devices communicating over a multi-frequency random access contention network.

The invention provides a high bandwidth data connection capability for supporting wireless local area networks, particularly to support user network access over personal mobile devices. Advantageously the present invention can minimize the bandwidth expended on dealing with contention, using frequency hopping communications over several channels and confining transmissions to coordinated time division slots. The time slot and frequency hopping sequences of each connected user devices are made known to a controller associated with the network in a centralized control embodiment. The sequences are made known to the other access points in a distributed control embodiment. The controller may be one of the master devices or a separate entity.

The frequency hopping sequences of each of the APs currently in communication over the network are thus known and collisions can be anticipated. According to one inventive technique, the controller assigns priorities to the devices. Alternatively, a protocol observed by the devices can determine priorities. The priorities can be determined, for example, as a function of message latency, previous unsuccessful attempts to transmit, type of device or the like. In any event, devices are discriminated by priority in one way or another.

It is possible to permit only the highest priority device(s) to transmit during the anticipated collision. The lower priority devices do not transmit during the collision slot, and lose the lost transmission opportunity or potential throughput. However this is substantially the same effect as if a collision had produced errors requiring retransmission, except only the lower priority device(s) are affected.

It is also possible to allow a collision to occur, but to correct some or all of its adverse effects. For example, the highest priority device(s) may be caused to shift, temporarily during the anticipated collision only, into a mode that may have a better probability of successful transmission. That mode might also be more demanding. For example a higher priority device can use more robust error correction during collision slots, which typically requires increased transmission redundancy and increased message processing resources. The higher priority device might use higher transmission power, which for a mobile device is more demanding of battery capacity. These added demands are used only during collisions.

In the foregoing examples, collisions are anticipated and are resolved in favor of a highest priority user device (or perhaps a number of higher priority devices) at the expense of lower priority devices. Priorities can be varied as circumstances change, particularly if the priorities are assigned in part based on message backlog (latency) or other factors that change from time to time.

In another example, collisions are anticipated and two or more or all of the devices continue to transmit notwithstanding the anticipated collision. However the probability of reception is improved by switching, during the anticipated collision, to a more robust mode. After the collision, the devices switch back to the normal and presumably less demanding mode.

Thus, according to the invention, spread spectrum packet-switching radio devices are operated in two or more ad-hoc networks or pico-networks that share frequency-hopping channels and time slots that may collide. The piconets can be short range wireless associations of communicating devices according to the Bluetooth industry protocol, or another protocol or arrangement having comparable features and needs. One device in each piconet is a synchronizing master and others are slaves that follow the master's frequency hopping sequence. The sequences of two or more operating piconets (masters) occasionally coincide, which could cause simultaneous transmissions that interfere or collide. The frequency hopping sequences of two or more masters are exchanged or otherwise made known, for example using identity codes, permitting the devices to anticipate collision time slots. Priorities are assigned to the simultaneously operating piconets during collision slots, e.g., as a function of their message queue size or latency, or other factors. Lower priority devices may abstain from transmitting during predicted collision slots, or a higher priority device may employ enhanced transmission resources during those slots, such as higher error correction levels, or as a third solution, two or more of the communicating devices can employ an enhanced transmission mode. Collisions are avoided or the higher priority piconet is made likely to prevail in a collision. Priorities are repetitively re-determined and re-assigned, to allocate communications resources among all the devices and piconets. A communications configuration according to the invention is shown in FIG. 1. Several localized networks 19, 20, 21 of several devices each, are defined by coordinated operation of the communicating devices, shown generally as devices 22. Some of these devices are "master" devices 25 (designated "M" in FIG. 1), which are operable to synchronize frequency hopping communications on an associated discrete localized networks or "piconets" 19, 20, 21 including that master and a number of "slave" devices 27 ("S" in FIG. 1).

In FIG. 1, some of the localized networks or piconets 19, 20, 21 can be wholly defined by wireless communication links between the communicating devices 22 that are members of the respective piconet 20, shown by broken lines. One or more devices on one or more of the piconets can also provide access as gateways to other networks, piconets or stand-alone devices. In FIG. 1, three piconets are shown, but it will be appreciated that additional piconets and communicating devices 22 can participate in a coupled-piconet "scatternet" as shown.

The master and slave designations of the communicating devices refer only to the fact that the master 25 of each localized network or piconet group 19, 20 or 21 determines the frequency hopping sequence to which the master 25 and all its associated slaves 27 conform when communicating on the piconet 20. In other respects, the master 25 and the slaves 27 can be peer devices. The communicating devices 22 can transmit and receive message packets for communicating with any of the other devices 22 that are on the same piconet 19, 20 or 21. Such messages also can be relayed between piconets. For example, devices 22 on piconet 19 might communicate with devices 22 that are members of more than one piconet 19, 20. The specific communications can be for any and all purposes for which communication and processing devices may be coupled in a network. It may be particularly advantageous if one or more of the masters 25 functions as an access point to a local or wide area network, and potentially from there into an intranet, extranet or global communications network (Internet), as discussed below.

Synchronization by each of the masters 25 comprises defining a sequence of time division multiple access time slots for the respective piconet 20 of that master, and defining the frequency hopping sequence to be used by all the devices communicating on that piconet 20, which is synchronized or controlled by its associated master 25. In short, the master 25 determines the frequency that will be used (modulated by a sending device and demodulated by one or more receiving devices) during each successive time slot. This frequency is changed among a number of frequencies or channels at a frequency hopping rate which spreads the spectrum of the communications in a way that permits the channels to be shared by many devices.

Figure 2:
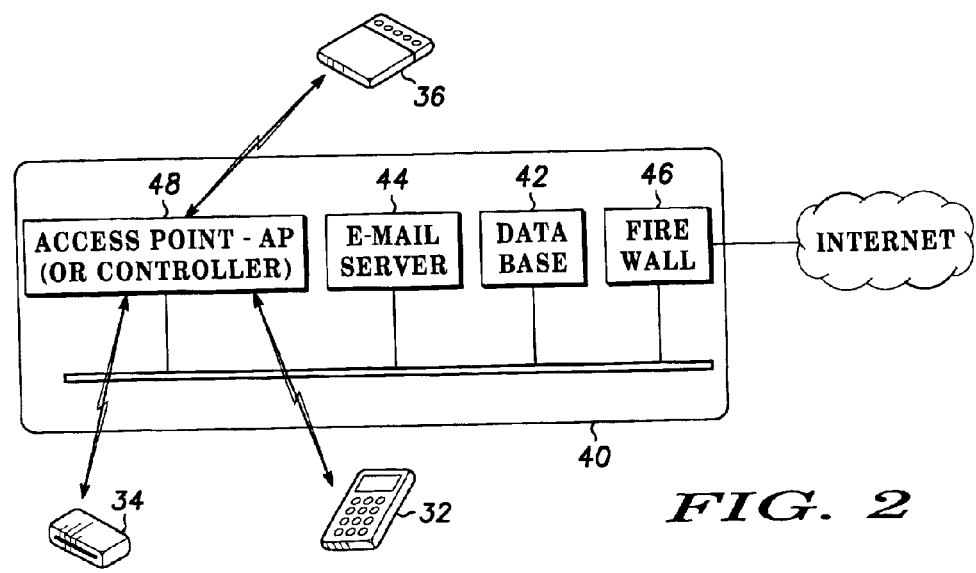
FIG. 2 is a block diagram illustrating exemplary component devices on a local area network arranged to communicate in one or more ad-hoc piconets as in FIG. 1.

The piconets 19, 20, 21 could be comprised wholly of hand carried wireless devices, examples such as a cellular telephone 32, a personal organizer or digital assistant ("palmtop" computer) 34, and a pager 36 being shown in FIG. 2. The invention is also applicable to communicating devices of other types, such as a wireless communication device in a vehicle (not shown), a PCMCIA card in a laptop or the like, or even an otherwise isolated peripheral device such as a keyboard for user input or printer for output, etc., that uses wireless communications to communicate with a processor.

Figure 3:
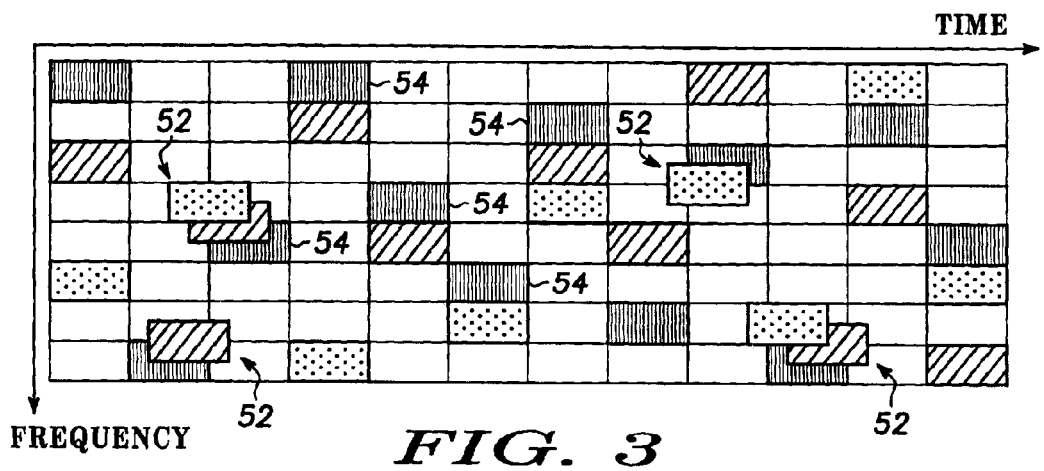
FIG. 3 is a timing diagram illustrating the possibility of message collisions in the arrangement shown in FIG. 1.

There are particular benefits for mobile communicating devices 22 if data communications are established with fixed networks 40 that can support large databases and other services that may be useful when operating a hand carried device but are not practical to maintain on a mobile hand carried device. One of such other services can comprise communication facilities along pathways other than wireless. Thus at least certain members of at least some of the piconet wireless networks 19, 20, 21 (such as AP 48) can be coupled to a local or wide area network 40 on an intranet, extranet, local area, wide area or global network (e.g., the Internet). Such an embodiment is shown in FIG. 2, wherein a hard wired local network 40 couples a full panoply of network resources to mobile devices 32, 34, 36. This provides a range of services to devices that individually might only support simple processing functions or perhaps only an input or output function, together with wireless communications for participation in a piconet. Such services may include e-mail through e-mail server 44, database access through a database 42, or internet access through the firewall 46 The invention is applicable to the Bluetooth industry consortium of wireless ad-hoc network communications, and to other similar arrangements. The Bluetooth standard is used herein as a non-limiting example of a multiple access frequency hopping network wherein a plurality of devices step through independently determined frequency hopping sequences. According to the invention, the incidence of collisions, which normally occur as shown in FIG. 3, is mapped and predicted. Steps are taken to modify the behavior of the communicating devices 22 under control of the respective master devices 25, and in particular APs 48, so as to control access during time slots characterized by predicted collisions, for example enforcing abstinence or modification of procedures by certain of the communicating devices 22.

FIG. 1 shows three ad-hoc networks or piconets, each having a number of terminal devices 22 in communication with one another, and each having one master 25. Most of the devices 22 in FIG. 1 are coordinated with one master 25 and thus follow one frequency hopping sequence. Certain of the devices are capable of coordinating to two or more hopping sequences and provide points at which communications can bridge between piconets 20. Thus certain of the devices 29, 28 respectively, operate simultaneously as a slave on two different piconets, or as a master on one piconet and slave on another. In the Bluetooth protocol, the available wireless communications bandwidth in the industrial-scientific-medical (ISM) band is subdivided into specific frequencies or channels. The protocol or rules of access determine the frequencies that can be used and the minimum rate at which the piconets and their devices 22 must change from one frequency to another. In this manner, the available bandwidth is shared among a plurality of piconets and devices 22 that may compete for the available bandwidth and access time. Usage is spread over the channels by the frequency hopping.

The industrial/scientific/medical band, which is employed according to the exemplary Bluetooth standard as well as other frequency hopping arrangements, occupies 2.402 to 2.480 GHz, subdivided into 79 channels of 1 MHz bandwidth. This frequency band is not necessarily limited to low power or short range applications. However, the Bluetooth exemplary standard specifically uses low power transmitters (e.g., 1 mW) to accomplish short range radio communications (e.g., within 10 m to 100 m). The specific communications among communicating devices 22 on a piconet can be any particular FHSS packet switched digital transmission protocol.

A preferred embodiment is described with reference to Bluetooth protocol communications, in the ISM band, and potentially using one or more aspects of IEEE Standard 802.11. It should be appreciated that these particulars only represent non-limiting examples. The invention is equally applicable to other frequency hopped spread spectrum communications such as Home RF, the Metricom network (Ricochet) and other similar arrangements.

As in any communications or computing network, a wide variety of applications are possible. Certain applications are particularly apt for ad-hoc networks. Mobile units 32, 34, 36 carried by persons or in vehicles can regularly test the airwaves for available services (i.e., for other devices equipped to participate in an ad-hoc network of the same type) and can initiate data communications when coming within range. This enables a sort of cellular communication wherein the mobile devices can change from communicating via one network 19, 20, 21 to another as the devices are transported into and out of range of the respective network. When a mobile device comes within range of a particular network device that is operated, for example, to accomplish a particular commercial objective, the mobile device becomes a temporary member of the ad-hoc or pico-network 19, 20, 21 and can enjoy most or all of the services that would normally be available only to devices that are wired into a local or wide area network by other means such as Ethernet connections or telephone modem lines or the like.

The services that are provided via the mobile devices advantageously relate to an objective associated with the location where the network 20 is operated. For example, a shopping mall or retail store might operate a Bluetooth-capable access point and/or provide other ad-hoc network support on its premises to enable shoppers to access a database of information about its products and services. A similar protocol that is apt for coupling different devices located at a residence is known as the Home RF SWAP protocol ("Shared Wireless Access Protocol"). Using the retail example, shoppers who visit the mall or store come within range, and can access the establishment's database. In this way, the shoppers could be directed to product locations, can determine and compare product specifications or prices, authorize or close transactions, view promotional opportunities, and otherwise communicate with the establishment and take advantage of offered services. The communications can include not only the establishment's access point and associated device(s), but also can include other devices as shown in FIG. 2, which may be in data communication with the device(s) supporting ad-hoc networking or access points.

In the example shown in FIG. 2, such a commercial establishment might operate one or more pico-networks as shown. The establishment could have a wired intranet comprising various servers and/or services, a database server 42 and an email server 44 being shown as examples. In FIG. 2 the various functions are represented as blocks such as servers coupled to a network. It should be appreciated that these blocks could represent distinct functions of a single server or perhaps multiple servers that are in data communication across some other data path. For example, the network can include a router or firewall 46 that is coupled to the Internet in order to facilitate access to global networks. Similar arrangements could access a company's wide area network or other configuration. The local network or intranet is rendered Bluetooth capable by a network access point or "AP" server 48. The AP server is equipped with at least one transmitting and receiving device capable of sending and receiving message packets while hopping through multiple frequencies. The AP server 48 also comprises a controller or processor (not shown) that permits the AP server to function as a slave or master in communication with mobile devices 22 such as the wireless telephone, personal organizer or palmtop computer, pager or other device as shown in FIG. 2.

In the Bluetooth standard, when two Bluetooth-equipped devices come within range of one another, certain preliminary operations are effected with the result that the devices determine the frequency hopping sequence that will synchronize communications between the devices. The sequence is provided by one of the devices, deemed to be the master. The other device conforms to the frequency hopping sequence and is a slave. If additional devices come within range, they become slaves and conform to the frequency hopping sequence dictated by the operating master of the piconet. In this standard, addressing limitations permit seven active slaves to each master. Additional slaves can be associated with a piconet, but typically those numbering over a given maximum (e.g., seven in Bluetooth) are placed in a less active mode (e.g., they are "parked") when up to seven other slaves are active.

The specific frequency hopping sequence used by the master can be determined in various ways. According to the preferred arrangement, which is compatible with the Bluetooth standard, each of the devices has a unique numeric identity code, for example 48 bits in length, that distinguishes the device from other devices. A standard algorithm available to all the devices allows the identity code of a master device to be resolved into a defined frequency hopping sequence, for example using the time of day as a randomizing seed.

A Bluetooth device searching for services regularly scans or samples at least a subset of the 79 possible frequency hopping channels in the ISM band, to find and synchronize with an existing piconet, or perhaps to find another searching Bluetooth device with which to establish a new piconet. A data packet found in such a search contains the identity code of a master, or perhaps that of another device searching for a master. The searching device can process an identity code found in a data packet to determine a frequency hopping sequence. The frequency where the data packet was found is then located in the hopping sequence. The device can then proceed through the hopping sequence together with the master of the piconet, or a searching device that finds another device can become the master of a newly established piconet.

Once synchronized to the master and aware of the master's identity code, the Bluetooth capable device jumps from one frequency to the next synchronously with the master and generally conducts packet switching operations in a conventional manner. Any possible data processing function might then be supported. Inasmuch as the piconet participating devices include mobile devices carried by users, the system is particularly apt for coupling a mobile device into communication with a network, providing location or enterprise specific data to a mobile device that is brought onto a premises by its user, and other similar functions.

Whereas a master can support a limited number of active slaves (and additional parked ones), if an establishment or the like needs to communicate actively with a larger number of devices, it might provide multiple APs 48. Even within the limitation of seven active slaves, the devices can be arranged as a number of overlapping piconets as shown in FIG. 1, sometimes known as a scatter-net. Although each piconet has a limited number of active slaves and one master, any of these devices can potentially be equipped to function as a member of two or more piconets at a time, or can be operated simultaneously to adhere to two different ongoing frequency hopping sequences, thereby providing a communications bridge between piconets. A device equipped and capable of operating synchronously as two or more masters or access points may have two or more transponder units that operate substantially independently. Alternatively, one transponder can be arranged to hop through multiple unsynchronized hopping sequences at substantially the same time.

A Bluetooth-type piconet advantageously couples mobile devices such as cellular telephones, pagers, portable computers, personal digital assistants and the like into data communication with one another and also with fixed devices that are similarly equipped with short range radio communications devices, such as desktop or mainframe computers, peripheral devices such as printers, scanners, etc. These fixed devices can be members of local or global networks 40 as generally shown in FIG. 2.

Local area networks are known for data processing systems operated by many businesses, typically including an Ethernet network to which processors such as desktop personal computers are hard wired through a network card. An exemplary arrangement, for example, might include a network server which operates as a system controller, maintains disk directories for access by users as virtual mapped drives, and coordinates operation of various application programs operable in the network server or one or more other servers coupled by a communication path. Such a network may contain a database specific to an enterprise such as a business operation. A product inventory database can be maintained by a product supplier, or a flight scheduling database for an airport, or an index of CAD or schematic drawings for an engineering firm, a document management program for a law firm, etc. Typically, one of the servers on the network operates as a firewall and enables users to access the Internet while blocking messages that might enable outside access to user subdirectories.

It is not convenient or appropriate to require occasional users such as visitors to one of the types of establishments mentioned, to have hardware to connect via hard wire to an enterprise computer system, nor is it convenient to provide mobile users with facilities by which they can physically connect to a network. However, it is convenient for mobile users to have wireless access to a network using their own hand carried device. Access can be provided over a relatively large geographic area via a wireless cellular telephone system. Advantageously however, such networks are configured like a cell phone network but the cells are geographically limited to an area associated with a particular enterprise, using short range radio communications. Short range service can also be provided by other modulation techniques such as ultrasonic or infrared signaling. Advantageously, small or "personal area networks" employ a general purpose digital band (e.g., in the area of 2.4 GHz), where a number of frequencies are available for use via spread spectrum frequency hopping transponders as described.

The Bluetooth standard for wireless piconets or personal area networks was developed by a consortium of companies. A standardized radio communications chip is incorporated into electronic devices and serves as a network connection to a limited area service zone served by a corresponding transponder, typically coupled to a fixed network. This mode of access to the network is through one or more Access Points or "APs" 48 and obviates hard wiring needs for voice and data access.

The Bluetooth standard is flexible regarding the specific communication parameters. For example three power classes are defined with maximum power outputs of 1 mW, 2.5 mW and 100 mW. Depending on propagation specifics, these power levels may be sufficient to provide coverage to areas of different sizes, such as an area as small as a room or as large as one or many nearby buildings. The device may be made controllable to switch between such power levels in different modes of operation.

FIG. 2 illustrates an example of a personal area network (PAN) system topology. The access device (one or more APs 48) provides the communication coupling that serves the function of hard wire connections in an enterprise local area network 40. In addition to the short range radio transponder of the access point or AP 48, the PAN system has all the capabilities of a local area network and can have a network server or controller, one or more servers for applications such as databases 42, email 44, and an Internet firewall 46.

The data throughput of the personal area network is partly a function of the number of APs coupled to the network. However, throughput per piconet may degrade if the number of APs is increased. One problem is co-channel and adjacent channel interference among two or more piconets. FIG. 3 graphically illustrates an example wherein a number of APs are operable at the same time to maintain piconets, and are in sufficient proximity to communicate on the same frequency channels or at least to affect one another by crosstalk or the like. The packets of each respective piconet are represented by different shading or hatching types. In the example of FIG. 3, the network may employ packet switching, wherein the time slots are defined by the frequency hopping intervals (in Bluetooth, 1,600 hops per second through an arbitrary order of sequential 1 MHz channels between 2.402 and 2.480 GHz). FIG. 3 illustrates double collisions and triple collisions 52 where messages that overlap in time and frequency interfere with one another because the hopping sequences 54 can and do sometimes overlap.

Figure 4:
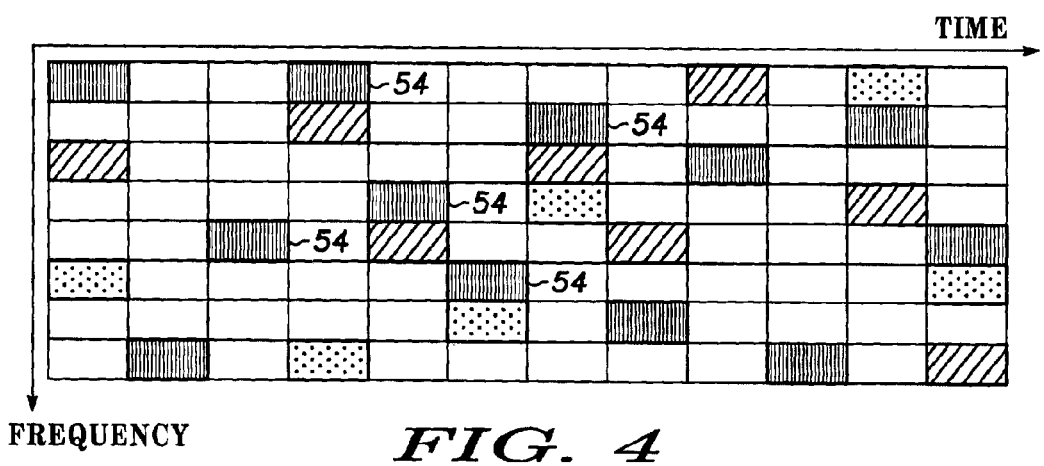
FIG. 4 is a timing diagram as in FIG. 3, illustrating coordination of the devices shown in FIG. 1, according to the invention.

According to the present invention, the occurrence of packet collisions and their impact on system throughput are avoided or held to a minimum. As shown in FIG. 4, the bandwidth is used substantially only for successful messages. This is accomplished by anticipating collisions and modifying the behavior of the prospective colliding piconets during the prospective collision slots.

According to the invention, the AP controllers 48 predict collisions based on the frequency hopping schemes employed by two or more piconets 19, 20, 21 that are geographically or otherwise in sufficient range to affect one another. The frequency hopping sequence of the communicating devices can be reported to the AP or controller 48 when a particular device commences communication through the AP. Alternatively, the pattern of each device can be inferred by the AP controller from the operation of the device (i.e., the hopping sequence can be observed). The controller compares the hopping sequences of the devices in communication, and marks the impending collision slots. According to one possible technique, all the potentially-colliding communicating devices except one can be disabled from communicating during the conflict time slot. The AP controller determines which of the devices will be permitted to transmit by a priority assignment technique, using one or more criteria as discussed below. Alternatively, all the potentially-colliding communicating devices except one can be handicapped relative to the one that is given priority, as also discussed herein. According to another alternative or additional technique, during the collision slots one or more (or perhaps all) of the colliding piconets adopt a more robust form of communication, for example using a more demanding error correction scheme, a higher power level or the like.

Disabling transmissions from all the communicating devices save one, effectively reduces the throughput load on the network by eliminating the processing, acknowledgment signaling and retransmission that the devices would be required to undertake in the event of a packet collision. During the collision of two packets, neither packet might be received without errors. The expected acknowledgment is not returned or an error is reported to the transmitting device and the particular packet must be re-transmitted. Eliminating the extra processing by disabling all the colliding devices, save one, reduces loading on the network, even though this may be accomplished by hindering, disabling or delaying some packet transmissions relative to others, or by imposing more demanding overhead (e.g., error correction) on one or more of the prospective colliding piconets.

The collision slots 52 are predictable from the hopping patterns and the hopping patterns are determined by the address of the AP device, which is a 48 bit unique address. The slave devices that communicate with the AP (namely the user devices) use the frequency hopping sequence of the AP with which they are communicating. The APs on a network and the user devices are synchronized by signaling on the ISM channel.

All collision slots are anticipated and noted. For this purpose, a collision is defined in a broad sense to include anticipated use of the same frequency channel, an adjacent channel, image, etc. The AP, or the user device or a controller can perform the collision slots identification, because the AP addresses, and therefore the hopping sequence, are known.

In the event of an anticipated collision based on the hopping sequence of two APs using the same channel or an adjacent channel, etc., only the assigned top priority device or devices can be allowed to transmit and the others required to abstain. It is possible that more than one priority device may function successfully at the same time, for example where each receiving device captures the sender's transmission. According to an advantageous embodiment of the invention, variations in the power level and in the error correction level can be coordinated with anticipated collisions. Where no collision is anticipated, the communications proceed without added error correction. Where a collision is anticipated, the error correction can be increased. Alternatively or additionally, the priority unit can be instructed to use a higher transmission power level during the anticipated collision or adapt in another similar way during the collision event.

Non-priority devices are allowed to resume transmissions once a collision event passes, and/or the error correction level, power level or the like can revert to a less demanding default level.

Preferably, information is exchanged between the devices and/or the APs that may warrant alteration of the priority assignments. For example, the devices can report their present battery charge status or battery life information, received signal strength information (RSSI), message latency or backlog data and throughput information. This information is provided in addition to the hopping pattern of the respective AP info between each other, thus making the necessary information available for the determination of collision slots as well as for the determination of priorities.

According to the invention, the APs are prioritized. The highest priority AP can be allowed to transmit its packet, while the others are instructed to hold their transmissions. Preferably the priorities assigned to the APs are reassigned on some regular cycle. The priorities can roll through a sequence such that each device changes regularly through a sequence of higher and lower priorities. For example, a first cycle A could have the order 1, 2, 3, ... N, and a next cycle B could have the order 2, 3, 4, ... N, 1, and so forth, such that each unit gets at least a regular turn at the higher priorities and an opportunity to clear out any latent messages that need to be sent.

Alternatively, priority may be assigned based on factors that vary as a function of a particular device's ability or need to transmit and receive successfully. For example the received signal strength or RSSI can be monitored and an AP that is found to cause relatively more interference can be assigned a relatively lower priority. Alternatively, a AP that is having problems communicating over a piconet may be given a higher priority than other APs for at least a time, to equalize the actual access to the data communications capability of the piconet.

An AP that has the lowest throughput likewise could be assigned the highest priority, as a method for equalizing the throughput among all the co-located APs. The priority can be assigned based on other factors such as battery life, so that a device with a battery that is fading or approaching its limit can receive a higher priority so as to complete a function before ceasing operations. The priority also may be assigned on factors which are related to other factors than equality of access. For example, a higher priority might be assigned routinely to devices associated with relative more expensive subscriptions, or an urgency of the message or a priority encoded in the message (e.g., 911 messages), etc.

Preferably, however, priority is assigned to achieve some optimization of access to the communications facilities. Thus priority can be proportional to the number of retries a device makes, which can be reported to other units on the piconet. Any AP that is having trouble or has been unlucky in accessing the next channels that come up in the hopping sequence is assigned higher priority.

Priority assignments preferably change from time to time (e.g., regularly) and advantageously are determined anew for each successive collision slot. Between collision slots the environment or criteria used to accord priority can change. For example, a new master device or APs may arrive or be initiated when existing piconets reach their limit of seven slaves per master. Signal levels may fluctuate. Throughput loading may vary as the different devices initiate or complete operations such as downloads. Preferably, the priorities are reassigned at a sufficient frequency to respond to the normal occurrence of changes of this type.

A collision can occur whenever events make it difficult or impossible for a paired transmitter and receiver to capture exclusive use of a frequency channel as necessary to transmit and receive a message without errors. It is possible that the packet sent from one of two simultaneous transmitting devices may be received because the associated transmitter and receiver capture the communications channel. For example, one of the colliding transmitters may overpower another. According to the embodiment of the invention shown in FIG. 6, it is possible to adjust the respective priorities of signals by altering the error correction that is used by the respective receivers.

Figure 6:
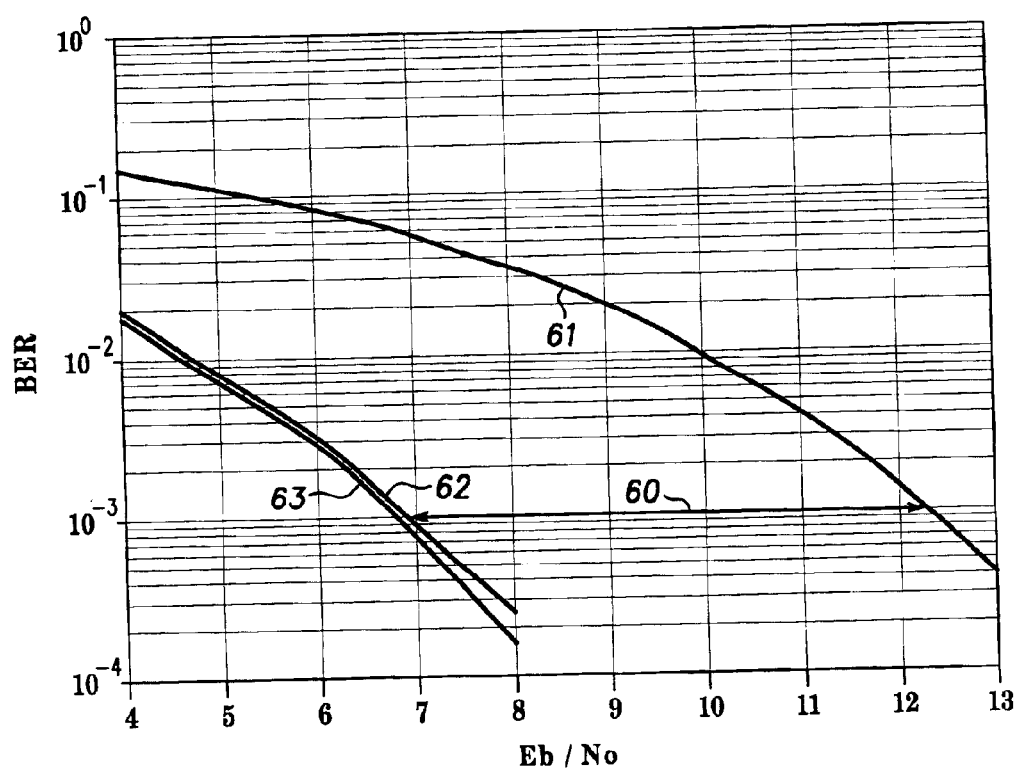
FIG. 6 is a plot of two modes of error correction between which the devices are switchable in order to manage the priority of access to time slots in which a collision is predicted to occur.

There are three error-correction schemes defined for Bluetooth baseband controllers, namely a 1/3 rate forward error correction code (FEC), a 2/3 rate forward error correction code and an automatic repeat request (ARQ) scheme for data. The FEC scheme builds redundancy into the message packet data payload so as to reduce the number of transmission errors that occur, requiring re-transmissions. FIG. 6 illustrates the gain associated with the system when error correction is applied. Maximum likelihood sequence estimation (MLSE) with zero error correction (see 61) adds less overhead than more extensive error correction. Forward error correction by repeating three bit per symbol techniques (majority decision and modified template being see 62, 63) can improve error correction gain by 5.3 dB 60.

According to the invention, one means by which the priority of the respective piconets can be controlled is to switch the higher priority piconet into a more extensive error correction mode. Any forward error correction that is employed causes increased overhead and reduced throughput compared to operation without error correction in an error-free environment. Bluetooth error correction is flexible or variable. Generally, the packet header is protected by a 1/3 rate FEC, particularly because it contains valuable link information and should survive bit errors. Increased error protection can be provided, for example, by applying a 2/3 rate FEC to all of the message or perhaps to part of the message (e.g., the header).

The foregoing error correction schemes can be preferentially applied only to the piconet that is assigned the highest priority, thereby improving the probability that a packet transmission on that piconet will survive a collision. The probability of surviving a collision is correspondingly lower for a lower priority piconet, which does not use error correction, or perhaps does not use the same extent of error correction as one or more higher priority piconets. As discussed, the error correction schemes can alternatively be applied to two or more, or possibly all of the piconets for the duration of the anticipated collision.

According to the invention, distinctions among the piconets in the extent of error correction are used instead of or in addition to distinctions that enable a high priority piconet to transmit and disable a low priority piconet during time slots when a collision is anticipated. Thus it is possible that the priorities are distributed such that two or more piconets can transmit during a collision time slot, and error correction or other aspects favor one over another. Alternatively, only one is permitted to transmit during collision time slots. Preferably, in those time slots where no collision is anticipated, the piconets are left free to operate without the overhead of added error correction or other regulation.

Figure 5:
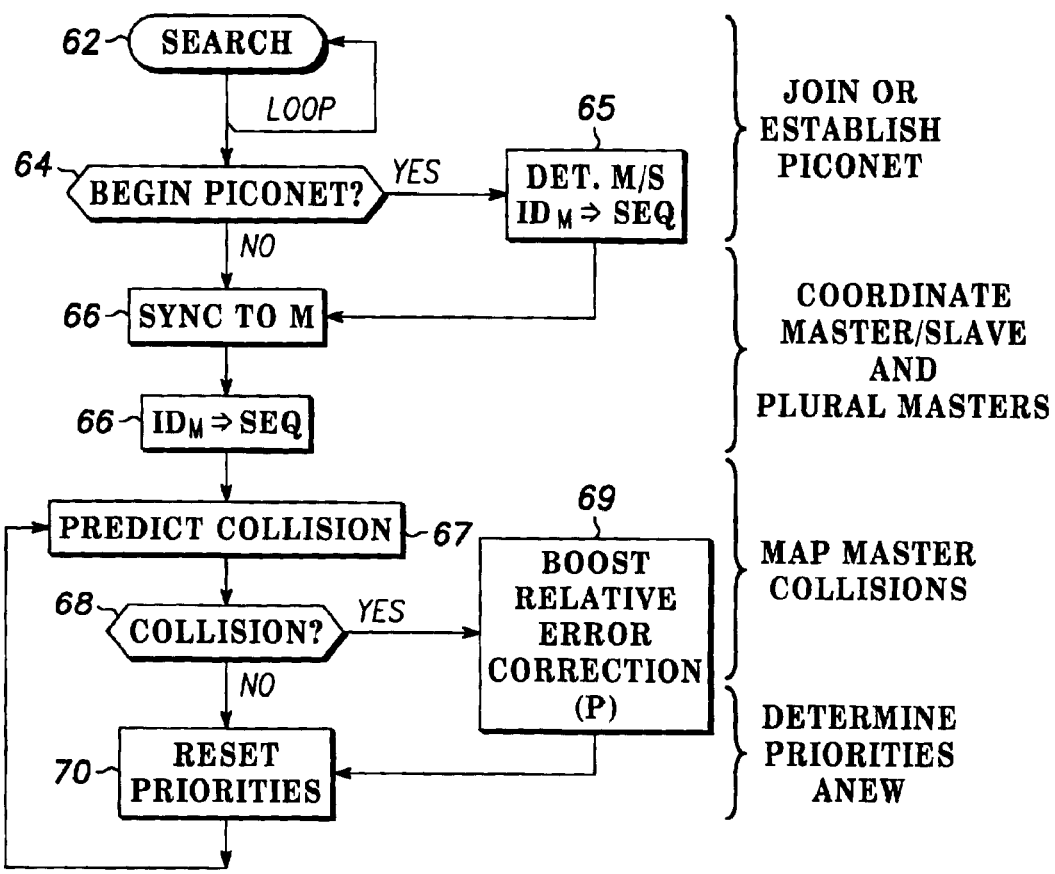
FIG. 5 is a flow chart illustrating the steps according to the invention whereby message collisions are avoided in a multiple access frequency hopping network according to the invention.

The sequence of steps according to the invention is illustrated in FIG. 5, in conjunction with the remaining figures. Initially, the respective devices 22 (see FIG. 1) may be a plurality of peer devices. Some of these devices can be associated with networks 40 that are fixed in position (FIG. 2). Others of the devices are mobile so that such devices come into communication range of other devices and establish wireless communications. The mobile devices establish communications with other mobile device or with fixed devices, which are equipped for frequency hopping communications according to the same protocols, such as Bluetooth, Home RF or another protocol.

Specifically, as shown in FIG. 5, a given device first establishes a piconet by initiating communications with another device or joins a piconet that has already been established. The subject mobile device at step 62 searches for an active channel in a repetitive loop. According to the Bluetooth protocol, the mobile device can check a number of the available channels for activity (e.g., 32 of the 79) and then repeat or check other channels. When activity is found, and at steps 64 and 65 in FIG. 5, the device distinguishes as to whether an established piconet is being joined or a new one is being established. The mobile device may need to negotiate with another device to establish a piconet, namely to determine which device will be the master and which the slave (step 65). This can be a matter of the order in which the units first transmit between one another. To join or to establish a piconet, at step 66 the mobile device or devices synchronizes to the master, thus forming a first wireless network comprising at least two devices. More particularly, the devices determine from an algorithm using the master unit ID ($ID_M$) as the input to the algorithm a hopping sequence. The output of the algorithm is a hopping sequence that is substantially unique to the master unit ID code. The devices are synchronized to time slots defined by the master of the respective piconet, and are operable to step through the same predetermined frequency hopping sequence so as to maintain ongoing packet switched communications in a point to point or multipoint manner among the member devices on the piconet.

In accordance with of the invention message collisions are prevented or minimized. Such collisions occur because two piconets 20 executing different frequency hopping sequences will occasionally arrive at the same frequency during a given time slot such that two devices transmit at the same time and frequency and interfere or collide. Inasmuch as all the devices on a given piconet are synchronized together, the invention applies to a situation where two or more piconets are sufficiently coupled due to overlapping ranges or otherwise, so as to interfere when crossing the same frequency in their hopping sequences. Collisions may occur directly by nearby piconets using the same channel, or indirectly by crosstalk in adjacent channels or the like.

According to the invention and as shown in FIG. 5, the two piconets, each having a plurality of communicating devices, are made aware of one another's frequency hopping sequences. In a preferred arrangement the piconets are made up of personal networks, e.g., as in FIG. 2, which have radio communication units functioning as network access points (APs) 48. A given device or network can have one AP 48 or can have more than one, which are capable of joining or maintaining different piconets, which have different frequency hopping sequences. Nevertheless, the unique ID codes of the master of each piconet (e.g., AP) are known. The ID codes of two APs on a personal area or similar network, that both function as masters, can be shared by communications over the network. If any given device functions as a slave or master on a piconet, the ID code of the master device on the piconet is known to or determined by each device as necessary for the devices to follow the same frequency hopping sequences. Therefore, it is possible for each such device to derive the different predetermined frequency hopping sequences of two (or more) wireless networks, to compare them over a prediction interval and to determine the particular time slots where the sequences will coincide.

The masters' hopping sequences are determined (step 66) and compared at least for a first and second wireless network over a prediction interval (e.g., for a next time slot, or N time slots, or until the next collision slot, etc.). The collisions are mapped. One or more time slots in which said frequency hopping sequences coincide and messages may collide, are predicted (step 67). The collisions can be predicted by masters or by slaves, by AP devices or by network controllers, etc. Each of these devices is coupled in sufficient communication with all the associated master device ID codes to predict collisions using an appropriate applications process.

The collisions are mapped over a prediction interval and compared at step 67 in FIG. 5 to identify collision time slots. The devices then resolve the collision time slots to prevent collisions. This involves determining which of the prospective colliding piconets will be accorded a higher priority and which accorded a lower priority. The priorities are assigned to at least a first and second wireless piconet and the communication procedures of one or both of the prioritized piconets are adjusted to reflect the priority. The priorities are assigned for the reasons discussed above, typically (but not necessarily) to equalize access to the communications capabilities of the network as a whole. Thus, for example, two APs or other devices can exchange information as to the size of their message queues, or statistics characterizing recent access, etc. The devices are programmed to employ the same method for assigning priorities. The higher priority device proceeds or its communicating capabilities are enhanced. The lower priority device abstains or its communicating capabilities are deliberately limited or retarded to give the higher priority device an advantage.

In the example shown in FIG. 5, the priorities are adjusted such that one of the first and second networks has improved access to transmit during said time slots in which the frequency hopping sequences coincide 68, by virtue of differences in error correction. At step 69 in FIG. 5, the error correction procedures of the higher priority device are boosted (and/or those of the lower priority device are reduced). For example, the higher priority device can initiate a higher level of feed forward error correction, and/or the lower priority device can reduce or eliminate its error correction. The collision does not occur or affects only the lower priority device. The higher priority device successfully completes a message transmission during the collision time slot. The lower priority device may abstain entirely during the conflict time slot to avoid a collision. Alternatively, the lower priority device can be permitted to attempt to complete a transmission notwithstanding the reduced error correction or other imposed handicap (e.g., a reduced power level). In short, operations are adjusted so that when a collision slot is predicted, it is likely that the high priority device will transmit successfully. It is unlikely that neither device will transmit successfully due to collision. It may be possible that both piconets might transmit/receive successfully during the conflict, but the prioritization simply ensures that the high priority one will be successful.

The frequency hopping sequences can be compared and the priorities assigned by the devices that initiate messages, by the radio equipped access points (APs), by at least one network controller that manages or synchronizes one of the networks, etc. All of these devices have access to the information (namely the master ID codes) necessary to anticipate a frequency hopping coincidence and message collision. Therefore any or all of these elements can operate to abstain or to enhance communication attempts during the conflict time slots.

According to the invention the priority assignments vary from time to time, and can be reassessed for every new collision time slot that is predicted (step 70). At least, the priority assignments are made for a next collision time slot by a time at least as early as the preceding time slot. Some or all of the devices that establish piconets are mobile devices, which occasionally join and depart particular wireless networks as they move into and out of range from time to time. Similarly, the application programs operated by the devices may have date transmission needs that occur in bursts, often due to user input selections. As a result, the message throughput situation and potentially the message latency loading varies for each of the devices. These aspects and other similar aspects can be reassessed to make new priority assignments as needed.

Accordingly, it is an aspect of the invention that information is provided on the network as needed to determine when collisions will occur, and information is provided to assess priority needs. Any or all of the devices can predict collisions. The devices can be programmed to automatically determine the priorities of the devices on the network and to act accordingly. Alternatively, one device determines the priorities and broadcasts priority tables or information to derive such tables, to all devices that participate in the network or ad-hoc network. Collision slot tables as well as priority tables can be exchanged among all entities participating in the network, so as to effect distributed or central control that reduces or eliminates message collision effects.

In possible variations, a central controller may determine standards by which distributed devices decide how the APs are assigned priority. The APs are informed of or determine from device ID codes which slots are subject to collisions. The APs are informed or determine when particular APs will be allowed to transmit or are expected to abstain.

Even without information circulating the ID codes of the masters that determine the frequency hopping sequences, distributed control can be effected by the devices monitoring or listening for activity on the channels in the ISM band. The devices can derive a collision pattern from the activity detected, and decide on their own whether to initiate transmissions in particular slots that are found to be subject to collisions. The decision is governed by a prioritization mechanism, but the mechanism can also be a distributed matter. For example, without knowledge of the situation of other devices, each of the devices could be programmed to conclude that it is a low priority device until some triggering occurrence which causes the device to consider itself high priority, such as having more than a predetermined number of packets latent in a queue, or having abstained during a given percentage of previous collision time slots.

The invention is particularly useful in situations in which multiple frequency hopping piconets are deployed in a close geographical region, such as a Bluetooth configuration in which many user devices are possible but each piconet is limited to a master and seven or fewer slave devices. Even with several concurrently active piconets, the hopping sequences are readily made known and therefore the collisions can be anticipated and scheduled around, preferably by a prioritization scheme that spreads access to the communication facilities evenly among the users according to some form of measure.

Although abstinence by low priority devices or piconets during predicted collision periods is one way in which the operation of the piconets is adjusted to reduce or eliminate collision problems, additional error correction may be applied to the packets of higher priority devices or piconets where the collisions are known to occur, with comparable effect. The distinction of priorities, whether used to govern access or the likelihood of capture, has the effect of improving overall message throughput capacity. Error correction and similar burdens are reduced during the slots that are known to be collision free. The error correction applied during collision slots as shown in FIG. 6, can achieve a 5.3 dB coding gain for high priority device communication.

A number of additional variations, improvements and specific applications of the foregoing techniques are possible and should now be apparent to persons skilled in the art. Various changes in the details, materials, and arrangements of the parts which have been described and illustrated above to explain this invention may be made by those skilled in the art without departing from the principle and scope of the invention as defined in the appended claims.

What is claimed is:

1. A data communication system comprising:
a plurality of radio devices communicating together in groups defining networks, at least certain member devices of the networks transmitting on the respective said network during time slots and at radio frequencies determined by a frequency hopping sequence;
wherein at least two of said groups having different frequency hopping sequences are sufficiently related that messages transmitted by at least two of the member devices can collide by causing at least one of co-channel and related channel interference between messages of the at least two said groups;
wherein at least one of the devices compares the different radio frequency hopping sequences of the at least two said groups and identifies time slots at which said sequences coincide sufficiently to produce said interference; and,
wherein at least one of said networks alters its behavior during the time slots at which the sequences coincide sufficiently to produce said interference, in a manner that reduces one of an incidence and an effect of collisions during the time slots when the sequences collide, the behavior being altered according to priorities assigned and reassigned periodically based upon current conditions of the first and second networks.

2. The data communication system of claim 1, wherein the groups having different frequency hopping sequences arc sufficiently close in at least one of physical proximity and signal strength to produce said collisions.

3. The data communication system of claim 1, wherein each of the networks comprises a master device and at least one slave device, wherein the master device determines the radio frequency hopping sequence for the network, observed by the master device and at least one slave device.

4. The data communication system of claim 2, wherein the devices have Unique addresses and the radio frequency hopping sequence for each said network is derived from the unique address of the master device of said network.

5. The data communication system of claim 1, wherein at least one of the networks that alters its behavior abstains from transmitting during the time slots at which the sequences collide.

6. The data communication system of claim 1, wherein at least one of the networks that alters its behavior changes at least one of transmission power and error correction level, during the time slots at which the sequences collide.

7. The data communication system of claim 1, wherein said at least one of the networks that a hers its behavior is chosen according to a priority repetitively based upon a comparison of operational criteria of the networks.

8. The data communication system of claim 7, wherein the priority is accorded a new for each of the time slots at which the sequences coincide.

9. The data communication system of claim 7, wherein the priority is accorded based on a comparison of the devices and the networks for at least one of: a power level of transmissions in at least one direction between the devices, an interference level of said transmissions, an error level of the transmissions, a data throughput of the respective networks, a battery condition, a message latency, a number of previous attempts to transmit, a capture effectiveness, message urgency, terms of a subscription and device type.

10. The data communication system of claim 9, wherein the priority is accorded in a manner tending to optimize data throughput for the devices on all the networks.

11. The data communication system of claim 1, herein the network is configured according to at least one of IEEE standard 802.11, a Bluetooth scatter network, a Home RF network and a Metricom Ricochet network.

12. A method of data communication using a plurality of peer devices, comprising the steps of:
establishing wireless frequency bopping communications between two or more of the devices such that a plurality of the devices associated as members of a first wireless network are synchronized to time slots and operable to step through a predetermined frequency hopping sequence;
establishing wireless frequency hopping communications between two or more of the devices such that a different plurality of the devices are similarly associated as members of a second wireless network operable to step through a different predetermined frequency hopping sequence, wherein the frequency hopping sequences of the first and second wireless networks differ but can coincide in particular time slots;
comparing the frequency hopping sequences of the first and second wireless networks over a prediction interval and identifying time slots in which said frequency hopping sequences coincide;
altering a behavior of at least one of the first and second wireless networks such that one of the first and second wireless networks has improved ability to receive during said time slots in which the frequency hopping sequences coincide, wherein the behavior is altered according to priorities assigned and reassigned periodically based upon current conditions of the first and second networks.

13. The method of claim 12, wherein the frequency hopping sequences are compared and the priorities are assigned by at least one master device synchronizing one of the networks.

14. The method of claim 12, wherein at least some of the devices are mobile devices operable to join and to depart said wireless networks from time to time.

15. The method of claim 13, wherein the at least one master is operable to cause an associated at least one of the first and second networks to abstain from communicating during said time slots in which the frequency hopping sequences coincide.

16. The method of claim 13, wherein the at least one controller is operable to cause ant associated at least one of the first and second networks to alter its behavior by at least one of abstinence and a change of at least one of transmission power and error correction level during time slots in which the frequency hopping sequences coincide.

17. The method of claim 12, wherein the priorities arc assigned for each instance in which the frequency hopping sequences coincide.

18. The method of claim 17, wherein the priority is accorded based on a comparison of the devices and the networks for at least one of: a power level of transmissions in at least one direction between the devices, an interference level of said transmissions, an error level of the transmissions, a data throughput of the respective networks, a battery condition, a message latency, a number of previous attempts to transmit, a capture effectiveness, message urgency, terms of a subscription and device type.

* * * * *

UNITED STATES PATENT AND TRADEMARK OFFICE
CERTIFICATE OF CORRECTION

PATENT NO. : 6,920,171 B2
DATED : July 19, 2005
INVENTOR(S) : Souissi et al.

It is certified that error appears in the above-identified patent and that said Letters Patent is hereby corrected as shown below:

Column 21,
Line 12, delete "a hers" and replace with -- alters --.
Line 16, delete "a new" and replace with -- anew --.
Line 30, delete "herein" and replace with -- wherein --.

Column 22,
Line 29, delete "ant" and replace with -- and --.

Signed and Sealed this

Eleventh Day of October, 2005

JON W. DUDAS
*Director of the United States Patent and Trademark Office*